United States Patent
Wu et al.

(10) Patent No.: US 8,953,874 B2
(45) Date of Patent: *Feb. 10, 2015

(54) CONVERSION OF MONOSCOPIC VISUAL CONTENT USING IMAGE-DEPTH DATABASE

(71) Applicant: Google Inc., Mountain View, CA (US)

(72) Inventors: Chen Wu, Mountain View, CA (US); Debargha Mukherjee, Sunnyvale, CA (US); Meng Wang, Brookline, MA (US)

(73) Assignee: Google Inc., Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/170,335

(22) Filed: Jan. 31, 2014

(65) Prior Publication Data

US 2014/0147033 A1    May 29, 2014

Related U.S. Application Data

(63) Continuation of application No. 13/527,415, filed on Jun. 19, 2012, now Pat. No. 8,644,596.

(51) Int. Cl.
*G06K 9/00* (2006.01)
*G06K 9/62* (2006.01)
*G06T 7/00* (2006.01)

(52) U.S. Cl.
CPC ........ *G06K 9/00201* (2013.01); *G06K 9/00208* (2013.01); *G06T 7/0075* (2013.01); *G06T 2207/10021* (2013.01); *G06T 2207/10024* (2013.01); *G06T 2207/20228* (2013.01)
USPC ........................................................ 382/154

(58) Field of Classification Search
None
See application file for complete search history.

(56) References Cited

U.S. PATENT DOCUMENTS

| | | | |
|---|---|---|---|
| 8,213,711 B2 * | 7/2012 | Tam et al. | 382/162 |
| 8,249,333 B2 | 8/2012 | Agarwal et al. | |
| 8,330,801 B2 * | 12/2012 | Wang et al. | 348/46 |
| 8,411,931 B2 | 4/2013 | Zhou et al. | |
| 8,488,868 B2 | 7/2013 | Tam et al. | |
| 8,644,596 B1 | 2/2014 | Wu et al. | |
| 2002/0191841 A1 | 12/2002 | Harman | |
| 2005/0053276 A1 | 3/2005 | Curti et al. | |
| 2007/0146232 A1 | 6/2007 | Redert et al. | |
| 2008/0199044 A1 | 8/2008 | Tsurumi | |
| 2010/0080448 A1 | 4/2010 | Tam et al. | |

(Continued)

OTHER PUBLICATIONS

A. Saxena, S.H. Chung, and A. Ng. 3D-Depth Reconstruction from a Single Still Image. International Journal of Computer Vision (IJCV), 2007.

(Continued)

*Primary Examiner* — Daniel Mariam
(74) *Attorney, Agent, or Firm* — Lowenstein Sandler LLP

(57) ABSTRACT

An image converter compiles three-dimensional content into a data store, identifies a number of stereo image pairs from the three-dimensional content, computes a depth map for each of the stereo image pairs from the three-dimensional content, and partitions the stereo image pairs in the data store into multiple categories. The image converter determines a depth cue for each of the categories based on the depth map for each of the stereo image pairs in each category. The image converter computes a depth map for a category associated with a two-dimensional input image based on the determined depth cue and renders a three-dimensional output image from the two-dimensional input image using the depth map for the category.

20 Claims, 10 Drawing Sheets

(56) References Cited

U.S. PATENT DOCUMENTS

| | | |
|---|---|---|
| 2011/0026808 A1 | 2/2011 | Kim et al. |
| 2011/0026840 A1 | 2/2011 | Tao et al. |
| 2011/0181588 A1 | 7/2011 | Barenbrug et al. |
| 2011/0242279 A1 | 10/2011 | Redert et al. |
| 2011/0255775 A1 | 10/2011 | McNamer et al. |
| 2013/0106837 A1 | 5/2013 | Mukherjee et al. |

OTHER PUBLICATIONS

A. Saxena, M. Sun, and A.Ng. Make3D: Learning 3D Scene Structure from a Single Still Image. IEEE Transactions on Pattern Analysis and Machine Intelligence (TPAMI), 2008.

A. Torralba, R. Fergus, W.T. Freeman, "80 million tiny images: a large dataset for non-parametric object and scene recognition", IEEE Transactions on Pattern Analysis and Machine Intelligence, vol. 30(11), 2008.

B. Liu, S. Gould, and D. Koller. Single Image Depth Estimation From Predicted Semantic Labels. IEEE Conference on Computer Vision and Pattern Recognition (CVPR), 2010.

Brox et al., "High Accuracy Optical Flow Estimation Based on a Theory for Warping." European Conference on Computer Vision (ECCV), 2004.

Fehn, C., "Depth-image-based rendering (DIBR), compression, and transmission for a new approach on 3D-TV," Sterioscopic Displays and Virtual Reality Systems XI., vol. 5291, pp. 93-104, May 2004.

Grundmann et al., Auto-Directed Video Stabilization with Robust L1 Optimal Camera Paths. IEEE Conference on Computer Vision and Pattern Recognition (CVPR), 2011.

Khan, et al. "Image-based material editing," ACM Transactions on Graphics, vol. 25, No. 3, pp. 654-663, Proceedings of the ACM SIGGRAPH conference, 2006. Section: 2.1.

Langer et al. "Depth Discrimination from shading under diffuse lighting." Perception vol. 29, pp. 649-660, 2000.

M. Guttmann, L. Wolf, and D. Cohen-Or. Semi-Automatic Stereo Extraction From Video Footage. IEEE International Conference on Computer Vision (ICCV), 2009.

M. Liao, J. Gao, R. Yang, and M. Gong. Video Stereolization: Combining Motion Analysis with User Interaction. IEEE Transactions on Visualization and Computer Graphics (TVCG), 2011.

Zhang et al., "Shape from shading: a survey." IEEE Transactions on Pattern Analysis and Machine Intelligence 21, 8, 690, 1999.

Zhang et al., "Consistent Depth Maps Recovery from a Video Sequence". IEEE Transactions on Pattern Analysis and Machine Intelligence (TPAMI), 31 (6): 974-988, 2009.

USPTO; Office Action for U.S. Appl. No. 13/370,736, mailed Oct. 31, 2013.

USPTO; Office Action for U.S. Appl. No. 13/478,449 mailed Oct. 4, 2013.

USPTO; Notice of Allowance for U.S. Appl. No. 13/527,415, mailed Sep. 27, 2013.

International Search Report and Written Opinion for PCT/US2012/063435, mailed Dec. 27, 2012.

* cited by examiner

\# CONVERSION OF MONOSCOPIC VISUAL CONTENT USING IMAGE-DEPTH DATABASE

RELATED APPLICATIONS

This application is a continuation of U.S. patent application Ser. No. 13/527,415, filed on Jun. 19, 2012, the entire contents of which are hereby incorporated by referenced herein.

TECHNICAL FIELD

This disclosure relates to the field of image processing and, in particular, to conversion of monoscopic visual content to stereoscopic 3D.

BACKGROUND

Advances in display technology have caused display devices capable of conveying a stereoscopic perception of three-dimensional (3D) depth to a view to become increasingly common. These 3D displays may be found in high-definition (HD) television sets, gaming devices, and other computing devices. The growing number of 3D displays has led to a need for additional 3D visual content (e.g., images, video). Conventionally, creating 3D content has been a difficult and time consuming process. A content creator, for example, would capture a subject using two cameras, combine the video or images from each camera, and use special software to make the 3D effect look accurate. This typically includes a lengthy, highly technical and expensive manual process. Further, conventional techniques for converting two-dimensional (2D) images and video to 3D may not be scalable given the time and resources it would require to convert a large number of images or video. In addition, conventional techniques are limited to converting specific types of images and video and may not be used for general 2D to 3D conversion tasks.

SUMMARY

The following is a simplified summary of the disclosure in order to provide a basic understanding of some aspects of the disclosure. This summary is not an extensive overview of the disclosure. It is intended to neither identify key or critical elements of the disclosure, nor delineate any scope of the particular implementations of the disclosure or any scope of the claims. Its sole purpose is to present some concepts of the disclosure in a simplified form as a prelude to the more detailed description that is presented later.

In one implementation, an image converter compiles three-dimensional content into a data store and identifies a number of stereo image pairs from each video. The image converter computes a depth map for each of the stereo image pairs, and partitions the stereo image pairs in the data store into a number of categories. The image converter determines one or more depth cues for each of the categories based on the depth map for each of the stereo image pairs in each category. The image converter computes a depth map for a category associated with a two-dimensional input image based on the determined depth cue and renders a three-dimensional output image from the two-dimensional input image using the depth map for the category.

In one implementation, a method includes receiving a two-dimensional image to be converted to a three-dimensional image; determining a category of the image; applying feature values for a number of pixels in the two-dimensional image to a feature-to-depth mapping function associated with the category to determine a depth value for each of the pixels, wherein the feature-to-depth mapping function is based on a depth cue for the category; and generating the three-dimensional image based on the depth values for the pixels of the two-dimensional image.

BRIEF DESCRIPTION OF THE DRAWINGS

The present disclosure is illustrated by way of example, and not by way of limitation, in the figures of the accompanying drawings.

DETAILED DESCRIPTION

Figure 1:
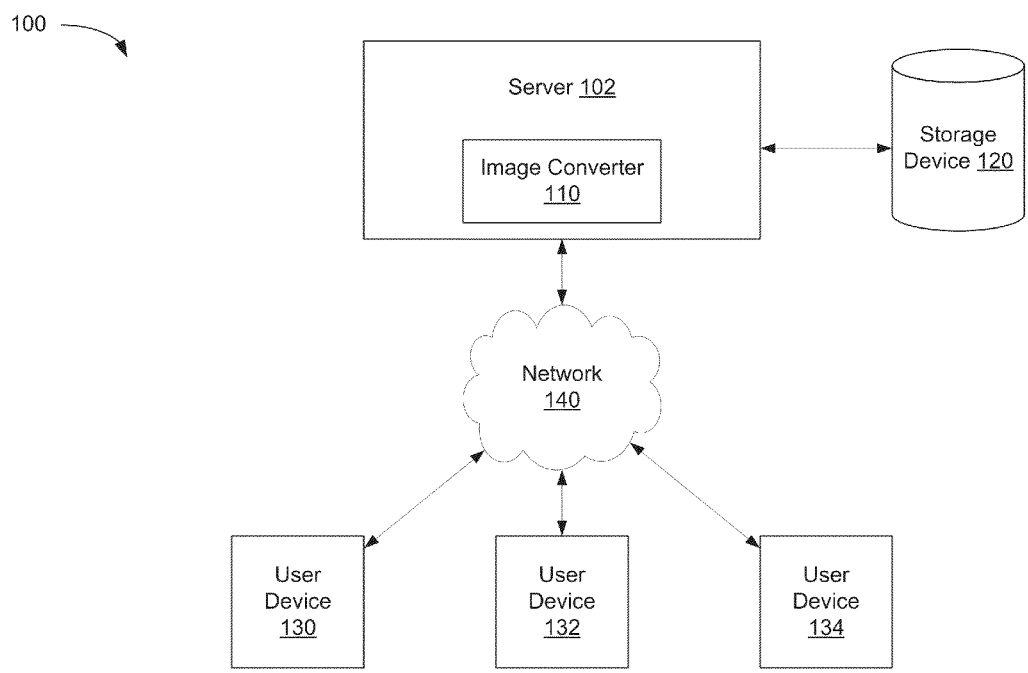
FIG. 1 is a block diagram illustrating an exemplary network architecture in which aspects of the present invention may be implemented.

Implementations are described for conversion of monoscopic visual content to stereoscopic 3D using an image-depth database. In one implementation, the image-depth database includes a large amount of 3D images and/or videos. This 3D content may be classified into a number of different categories such as indoor vs. outdoor scenes, daytime v. nighttime scenes, etc. In one implementation, the outdoor scenes are divided into sub-categories, such as urban scenes, greenery scenes, desert scenes, beach scenes, etc. Images are classified into the categories based on the assumption that similar images will share similar visual characteristics (e.g., colors, objects, textures, etc.).

The image-depth database may include this 3D content as well as one or more depth cues associated with each category. Examples of the depth cues may include a color-depth prior, a spatial-depth prior, or some other depth cue. A prior may include a broad statistical average of values for a particular feature, without including local (i.e., image specific) information. A prior may be used to generate a feature-to-depth function, which represents a depth value associated with a certain feature (e.g., a color) of one or more pixels of the image. For example, a feature-to-depth mapping function can be generated using a color-depth prior by calculating the average depth values for pixels of a given color across all of the 3D images in the database that fall within a given category or sub-category. Similarly, a feature-to-depth mapping function can be generated using a spatial-depth prior by calculating the average depth values for pixels in a given location in the image across all of the 3D images in the database that fall within a given category or sub-category. This assumes that objects in images of the same category having the same color or at the same location in the image will have the same or similar depth values (i.e., a distance from the viewpoint). The resulting feature-to-depth mapping function may be applied to a 2D input image to generate depth values for each pixel in the 2D input image. These depth values can be used to automatically convert the 2D input image into a 3D output image.

Implementations of the conversion methods described herein may be useful in a number of scenarios, such as if it is desired to impose a prior on the depth map generated based on training of a specific class of images. The prior could be a spatial prior, based on the fact that for most images, the depth on the lower and mid portion of the scene is closer than the rest of the image. However, since the spatial prior has no relationship with the actual objects in a scene, it may not be accurate to use this depth map directly. In one implementation, an approximate depth map is used to generate a final depth map that is consistent with object boundaries, while still maintaining the general trend provided in the example. In one implementation, the approximate depth map is obtained using motion analysis and segmentation. The motion analysis and segmentation methods may produce results that are noisy (both spatially and temporally), and will generally not follow edges of objects well. Thus, additional refinement may be beneficial. In addition, since these motion analysis methods are computationally quite expensive, they may not be used for every frame, but rather only occasionally when the scene characteristics change sufficiently. In another implementation, the approximate depth map is obtained using a database of a large number of image:depth-map pairs. For any given query image, there is a first step that finds a set of similar looking images from the database and retrieves their corresponding depth maps. These maps and the images are combined by some means (one implementation just takes the closest image, another implementation takes the average of the few closest ones, etc.), to obtain an example depth map associated with an example color image.

Implementations of the conversion techniques described herein allow for fully automatic conversion of 2D visual content to 3D. This can allow an individual to avoid the costly and time-intensive processes of capturing a 3D image or manually converting an existing 2D image to 3D. The use of a feature-to-depth mapping function, which corresponds to images in an image-depth database, allows for a more accurate prediction of the depth values for the image. In turn, this can lead to a more accurate and realistic rendering of the 3D output image. In addition, utilizing a large database of images for the comparison increases the possibility that a visually similar image or images can be found, facilitating the conversion of many types of visual content. In one implementation, millions of images are available for comparison.

FIG. 1 is a block diagram illustrating an exemplary network architecture in which aspects of the present invention may be implemented. The network architecture 100 may include one or more servers 102 communicating with one or more user devices 130, 132, 134 over one or more networks 140, according to one implementation. Network 140 can be a local area network (LAN), a wireless network, a telephone network, a mobile communications network, a wide area network (WAN), such as the Internet, or similar communication system. User devices 130, 132, 134 may be any type of computing device including server computers, gateway computers, desktop computers, laptop computers, mobile communications devices, cell phones, smart phones, hand-held computers, tablets, or similar computing devices. The user devices 130, 132, 134 may be variously configured with different features to enable viewing of visual content, such as images, videos, etc.

Server 102 may include a network-accessible server-based functionality, various data stores, and/or other data processing equipment. The server 102 may be implemented by a single machine or a cluster of machines. Server 102 may include, for example, computer system 1000 of FIG. 10. In one implementation, server 102 includes image converter 110. Image converter 110 can receive a two-dimensional input image (e.g., from a user or a computer application program) that is to be converted to a three-dimensional output image. Using a corresponding feature-to-depth mapping database in storage device 120, which may store various feature-to-depth mapping functions for different categories of visual content, image converter 110 can automatically generate the three-dimensional output image, as will be described below.

In one implementation, storage device 120 includes an image data store including a number of 3D images as well as, possibly, a number of 2D images or video. The 3D images may be divided into a variety of categories or classifications based on visual features of the images. Examples of the categories may include indoor vs. outdoor scenes, daytime v. nighttime scenes, etc. In one implementation, the outdoor scenes are divided into sub-categories, such as urban scenes, greenery scenes, desert scenes, beach scenes, etc. For each category and/or sub-category, a feature-to-depth mapping database (which may also be stored in storage device 120) may include one or more feature-to-depth mapping functions, each based on a depth cue. Examples of the depth cue may include a color-depth prior, a spatial-depth prior, or some other depth cue. A prior may include a broad statistical average of values for a particular feature, without including local (i.e., image specific) information. Thus, for example, the feature-to-depth mapping function based on a color-depth prior may be based on the average depth values for pixels of a given color across all of the 3D images in storage device 120 that fall within a given category or sub-category. Similarly, the feature-to-depth mapping function based on a spatial-depth prior may be based on the average depth values for pixels in a given location in the image across all of the 3D images in storage device 120 that fall within a given category or sub-category.

In response to a request from a user (e.g., received through one of user devices 130, 132, 134), image converter 110 can converter one of the 2D images or videos to 3D. In another implementation, a user may provide a 2D image to be converted that was not previously stored in storage device 120. Image converter 110 can classify the 2D input image according to one of the categories and/or sub-categories, and determine a feature-to-depth mapping function corresponding to one depth cue or corresponding to a combination of multiple depth cues. As will be described below, using the feature-to-depth mapping functions, image converter 110 can automatically generate a 3D output image based on the 2D input image.

In one implementation server 102 may include image converter 110 and storage device 120. In another implementation, storage device 120 may be external to server 102 and may be connected to server 102 over a network or other connection. In other implementations, server 102 may include different and/or additional components which are not shown here so as not to obscure the illustration of implementations of the present disclosure. Storage device 120 may include one or more mass storage devices which can include, for example, flash memory, magnetic or optical disks, or tape drives; read-only memory (ROM); random-access memory (RAM); erasable programmable memory (e.g., EPROM and EEPROM); flash memory; or any other type of storage medium.

Figure 2:
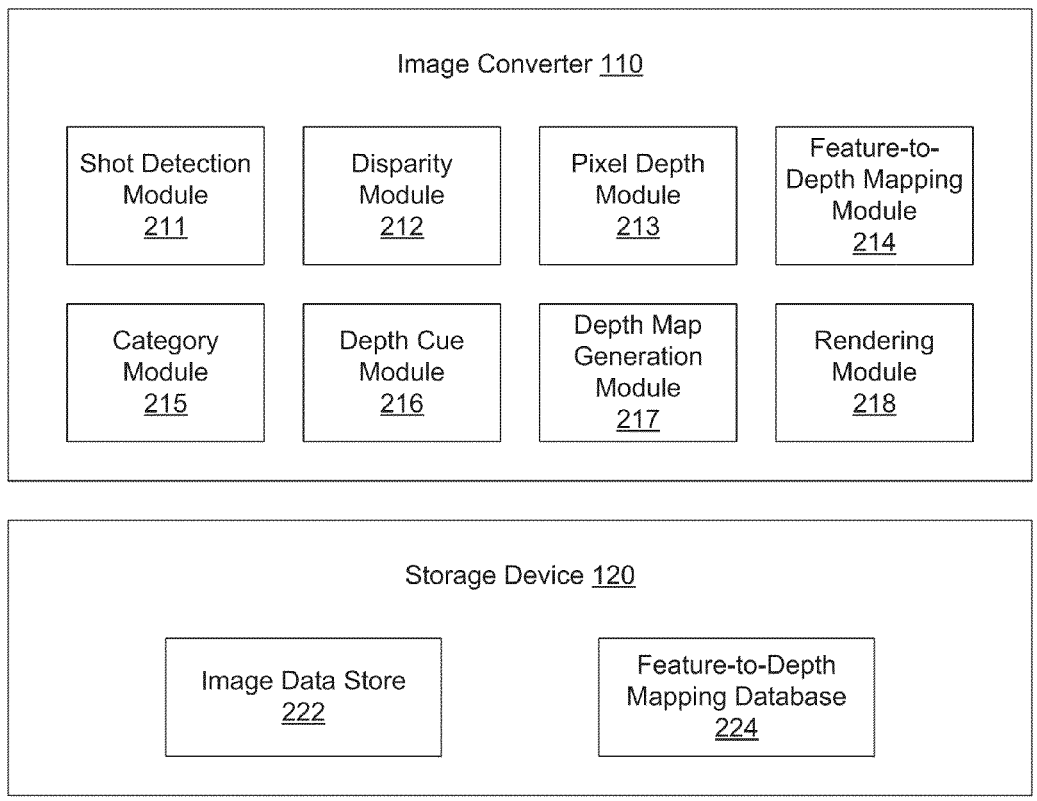
FIG. 2 is a block diagram illustrating an image converter for conversion of monoscopic visual content to stereoscopic 3D, according to an implementation.

FIG. 2 is a block diagram illustrating an image converter for conversion of monoscopic visual content to stereoscopic 3D, according to an implementation of the present disclosure. In one implementation, image converter 110 may include shot detection module 211, disparity module 212, pixel depth module 213, feature-to-depth mapping module 214, category module 215, depth cue module 216, depth map generation module 217, and rendering module 218. This arrangement of modules may be a logical separation, and in other implementations, these modules or other components can be combined together or separated in further components, according to a particular implementation. In one implementation, storage device 120 may include image data store 222 and feature-to-depth mapping database 224. In one implementation, image converter 110 maintains image data store 222 and feature-to-depth mapping database 224. Together these form a data set that may be used for more accurate 2D to 3D conversion. Image converter 110 can receive a two-dimensional input image (e.g., from a user or a computer application program) that is to be converted to a 3D output image. Using feature-to-depth mapping functions generated from the 3D images in image data store 222 and stored in the corresponding feature-to-depth mapping database 224, the various modules of image converter 110 can automatically generate the 3D output image, as will be described below.

In one implementation, modules 211-218 are used to generate, from the images and videos in image data store 222, data for the feature-to-depth mapping database 224. Image data store 222 may include, for example, various 3D images and/or videos. In one implementation, each 3D image (or frame of a 3D video) includes or is associated with a stereo image pair which, when viewed, creates an illusion of depth. Generally, the image pair includes two images (e.g., left image and right image) of the same subject, taken from slightly different viewpoints (roughly equal to the distance between a person's eyes). Thus, each point in the two images will have a slight offset (measured in pixels) that is proportional to the distance the point is from the viewpoint. This offset may be referred to as disparity.

Shot detection module 211 can perform video processing on a 3D video from image data store 222 to automatically detect transitions between shots or scenes in the video for the purpose of temporal segmentation of the video. Shot detection module 211 can split up the 3D video into basic temporal units called shots or scenes. A shot or scene may be a series of interrelated consecutive pictures or frames taken contiguously by a single camera and representing a continuous action in time and space. Upon identifying a shot or scene, shot detection module 211 may store one or more representative frames (e.g., stereo images pairs) in image data store 222. The representative frames may be one example of the shot that shares visual qualities (e.g., colors, objects, textures, etc.) of most frames in the shot. In another implementation, shot detection module 211 may store all frames in image data store 222. Identifying different shots and scenes may be advantageous because different shots may have different disparities and may fit into different categories. By separating the 3D video into shots, image converter 110 may be ultimately be able to generate more accurate 3D content from 2D input images.

Disparity module 212 can calculate a disparity for each set of stereo image pairs in image data store 222. In one implementation, the images in image data store 222 are the frames identified by shot detection module 211. In one implementation, disparity module 212 can perform an image rectification process, where the images in the image pair are rotated to allow for disparities in only the horizontal direction. Disparity module 212 may employ an algorithm that scans both the left and right images for matching image features. One approach to this problem is to form a smaller image patch around every pixel in the left image. These image patches are compared to possible disparities in the right image by comparing their corresponding image patches. For example, for a disparity of one, the patch in the left image would be compared to a similar-sized patch in the right, shifted to the left by one pixel. The comparison between these two patches can be made by attaining a computational measure from one of the following equations that compares each of the pixels in the patches. For the following equations, "L" and "R" refer to the left and right columns, "r" and "c" refer to the current row and column of either images being examined, and "d" refers to the disparity of the right image.

Normalized correlation:

$$\frac{\sum\sum L(r,c) \cdot R(r,c)}{\sqrt{(\sum\sum L(r,c)^2) \cdot (\sum\sum R(r,c)^2)}}$$

Sum of squared differences: $\sum\sum(L(r,c)-R(r,c-d))^2$

Sum of absolute differences: $\sum\sum|L(r,c)-R(r,c-d)|$

The disparity with the lowest computed value using one of the above equations may be considered the disparity for the point in the image. This lowest computed value indicates that the corresponding algorithm has found a good match, relative to the other algorithms, of corresponding features in both images. Disparity module 212 may similarly calculate a disparity for additional points and/or every point in the image pair.

Pixel depth module 213 may determine a depth value for each point in the 3D image. In one implementation, pixel depth module 213 uses the disparity calculated by disparity module 212 as the depth value. In other implementations, the depth value is a function of or otherwise based on the disparity (e.g., proportional to the disparity). In one implementation, pixel depth module 213 determines a depth value for every pixel in the 3D image from data store 222. Pixel depth module 213 may store these depth values, for example, in metadata associated with the images in image data store 222. The depth values may be combined based on pixel location, to generate a depth map. The depth map relates the distances of objects in the image from a viewpoint.

Feature-to-depth mapping module 214 can generate a feature-to-depth mapping function for the 3D image based on one or more features of the pair of images associated with the 3D image and the depth values determined by pixel depth module 213. In one implementation, the feature used to generate the function may be color. Each pixel of the pair of images associated with the 3D image has a known color value (e.g., determined from image metadata) and may have a depth value determined and stored as metadata by pixel depth module 213. The feature-to-depth mapping function may aggregate the depth values for pixels of the same or similar colors, based on the assumption that objects in the image having the same or similar color will also have a same or similar depth value. In other implementations, other features may be used to generate the feature-to-depth mapping function, either in place of or in addition to color, such as texture, location, shape, etc. In another implementation, feature-to-depth mapping module 214 may combine (e.g., average) the depth values for pixels of a certain color across multiple or all images in image data store 222, in order to generate to feature-to-depth mapping function. The resulting function can ultimately receive a color value (or other feature value) for a certain pixel or other point on a 2D input image as an input, and output a depth value for that pixel. Additional details of the feature-to-depth mapping function are described below.

In one implementation, feature-to-depth mapping module 214 may generate multiple feature-to-depth mapping functions for a single image in image data store 222. Different functions may be generated, for example, for different regions of the image. In one implementation, an image from image data store 222 may be logically divided into a number of regions (e.g., two, four). Feature-to-depth mapping module 214 may treat each region as its own individual image and determine a feature-to-depth mapping function specific to that region in the manner described above. In one implementation, feature-to-depth mapping module 214 may store the multiple functions corresponding to the image in database 224. In another implementation, however, the multiple functions may be combined (e.g., using a linear combination based on the distance from a pixel to the center of each region) into a single function that is stored in database 224 for example. The linear combination may eliminate potential "boundary effects" generated by switching feature-to-depth mapping functions across the different regions.

Upon completion of generating the feature-to-depth mapping function, the feature-to-depth mapping function for the image from image data store 222 may be stored in a corresponding entry in feature-to-depth mapping database 224. In one implementation, feature-to depth mapping database 224 may have some other structure besides a database (e.g., a list of key-value pairs). In one implementation, feature-to-depth mapping database 224 may be a separate data structure (as shown), however in other implementations, the mapping information may be stored in the metadata of image data store 222. Image converter 110 can use the feature-to-depth mapping database 224 to automatically generate a 3D output image from a 2D input image.

Category module 215 can classify the 3D images in image data store 222 or a 2D input image into one or more of a number of categories and/or subcategories. Examples of the categories may include indoor vs. outdoor scenes, daytime v. nighttime scenes, etc. In one implementation, the outdoor scenes are divided into sub-categories, such as urban scenes, greenery scenes, desert scenes, beach scenes, etc. These are merely examples of the categories and subcategories which category module 215 may use, and it should be understood that any number of different and/or additional categories may be used. In one implementation, category module 215 can examine visual features of an image (e.g., predominant colors, shapes, brightness, etc.) and compare those features to listed features associated with the categories. In one implementation, the categories and sub-categories are manually defined by a user, developer, administrator, etc. In another implementation, the categories and sub-categories are not manually defined, but rather category module 215 automatically learns the categories using clustering techniques on the images. In one implementation, category module 215 uses a k-means clustering method to partition the images in image data store 22 into k categories, where k is an integer value. The value of k may be selected according to the size and richness of image data store 222. Category module 215 can partition the images into k clusters (i.e., categories) where each image is placed in the cluster with the nearest mean value of comparable spatial extent.

Depth cue module 216 can determine one or more depth cues for each of the categories used by category module 215 to classify the images in image data store 222. Examples of the depth cue may include a color-depth prior, a spatial-depth prior, or some other depth cue. A prior may include a broad statistical average of values for a particular feature, without including local (i.e., image specific) information. Thus, for example, the feature-to-depth mapping function based on a color-depth prior may be based on the average depth values for pixels of a given color across all of the 3D images image data store 222 that fall within a given category or sub-category. Similarly, the feature-to-depth mapping function based on a spatial-depth prior may be based on the average depth values for pixels in a given location in the image across all of the 3D images in image data store 222 that fall within a given category or sub-category. For each category and/or sub-category, depth cue module 216 may apply the depth cues to the images to generate one or more feature-to-depth mapping functions, each based on a depth cue. In one implementation, the functions may be based on multiple depth cues to further refine their accuracy when converting a 2D input image to a 3D image. The feature-to-depth mapping functions may be stored in feature-to-depth mapping database 224.

Depth map generation module 217 may compute a depth map for a 2D input image based on the feature-to-depth mapping function(s) stored in feature-to-depth mapping database 224. Image metadata received with the input image may include, for example, a color value associated with each pixel in the input image. A depth value can be calculated for each pixel by applying the color values (or other appropriate feature values) as inputs to the feature-to-depth mapping function. Depth-map generation module 217 may perform these calculations and can store the resulting depth values (e.g., a depth map) in storage device 120. An example of a resulting depth map 830 is shown in FIG. 8B.

Rendering module 218 may render a three-dimensional output image (i.e., a stereo image pair) based on the input image and the depth values calculated by depth map generation module 217. In one implementation, rendering module 218 uses depth image based rendering (DIBR) techniques to generate the 3D image. DIBR techniques can render a 2D image based on another 2D image and a per pixel depth map. The original 2D image becomes one of two views that make up a 3D image, while the DIBR-rendered 2D image becomes the second view. In one implementation, the original 2D image is the left view, while the rendered 2D image is the right view. In other implementations, this may be reversed. Given the per-pixel depth map, a displacement map may be generated indicating how much each pixel should move from the left view to the right view. The relationship between depth and displacement may be approximately linear; however, some parameters may be adjusted in order to control how much an object "pops out" of a screen or how much it appears to extend behind the screen. Once the displacement map is generated, the pixels may be shifted from the left view to the right view to render the right view, while making sure that pixels which are in front occlude pixels in the back if multiple pixels from the left view map to the same pixel in the right rendered image space. Once all the pixels have been shifted, there may still be some holes left in the rendered right view. An in-painting (image interpolation) technique may be employed to fill up the holes from the neighboring pixels in the rendered image. This yields the final rendered right view. In order to create high quality rendering, the rendering may be conducted in an intermediate higher resolution pixel grid by interpolating the left view and the per-pixel depth map. Once the rendered image is obtained also at the higher intermediate resolution, it can be scaled back to the desired resolution.

Figure 3:
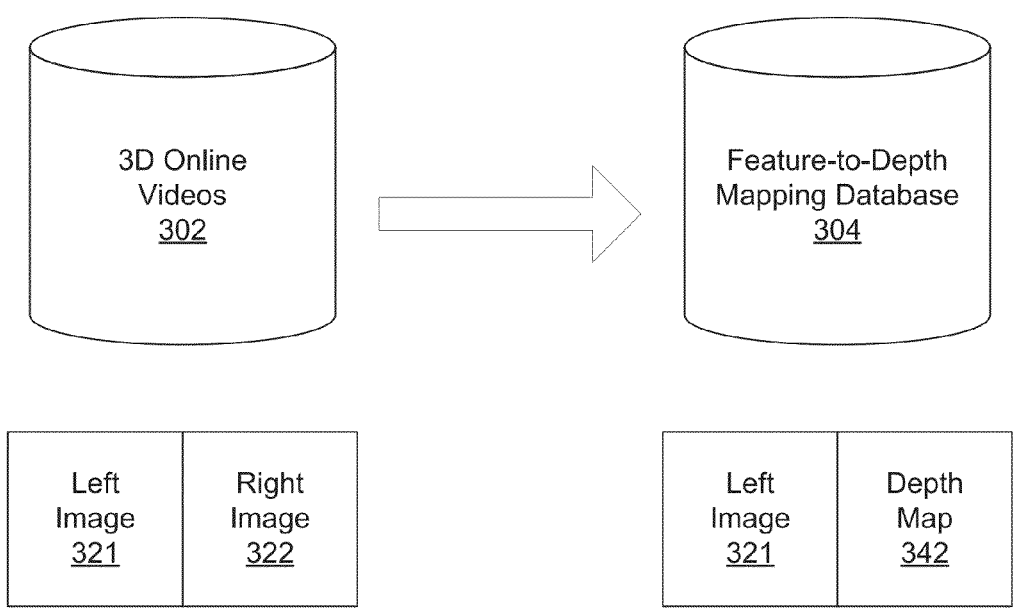
FIG. 3 is a block diagram illustrating an image conversion processing flow, according to an implementation.

FIG. 3 is a block diagram illustrating an image conversion processing flow, according to an implementation of the present disclosure. The various modules and components may be described in regards to their roles in converting monoscopic videos or images to stereoscopic 3D. In one implementation, 3D online videos 302 are processed and used to generate feature-to-depth mapping database 304. Feature-to-depth mapping database 304 can be used to automatically convert a 2D input image into a 3D output image. In one implementation, key frames (e.g., left image 321 and right image 322) are extracted from a data store of 3D images or videos 302. The 3D videos may include user uploaded 3D online videos. As discussed above, disparity module 212 can compute a disparity between left image 321 and right image 322 and store it (e.g., in storage device 120 based on an index given for left image 321). Pixel depth module 213 can compute a depth map 342 for the stereo image pair based on the disparity and may store the depth map 342 in association with left image 321, for example, in feature-to-depth mapping database 304.

FIGS. 4, 5, 6 and 9 are flow diagrams illustrating an image conversion method, according to some implementations of the present disclosure. The method 400 may be performed by processing logic that includes hardware (e.g., circuitry, dedicated logic, programmable logic, microcode, etc.), software (e.g., instructions run on a processing device to perform hardware simulation), or a combination thereof. The method 400 can convert monoscopic visual content to stereoscopic 3D. In some implementations, the methods are performed by image converter 110 as shown in FIGS. 1 and 2.

Figure 4:
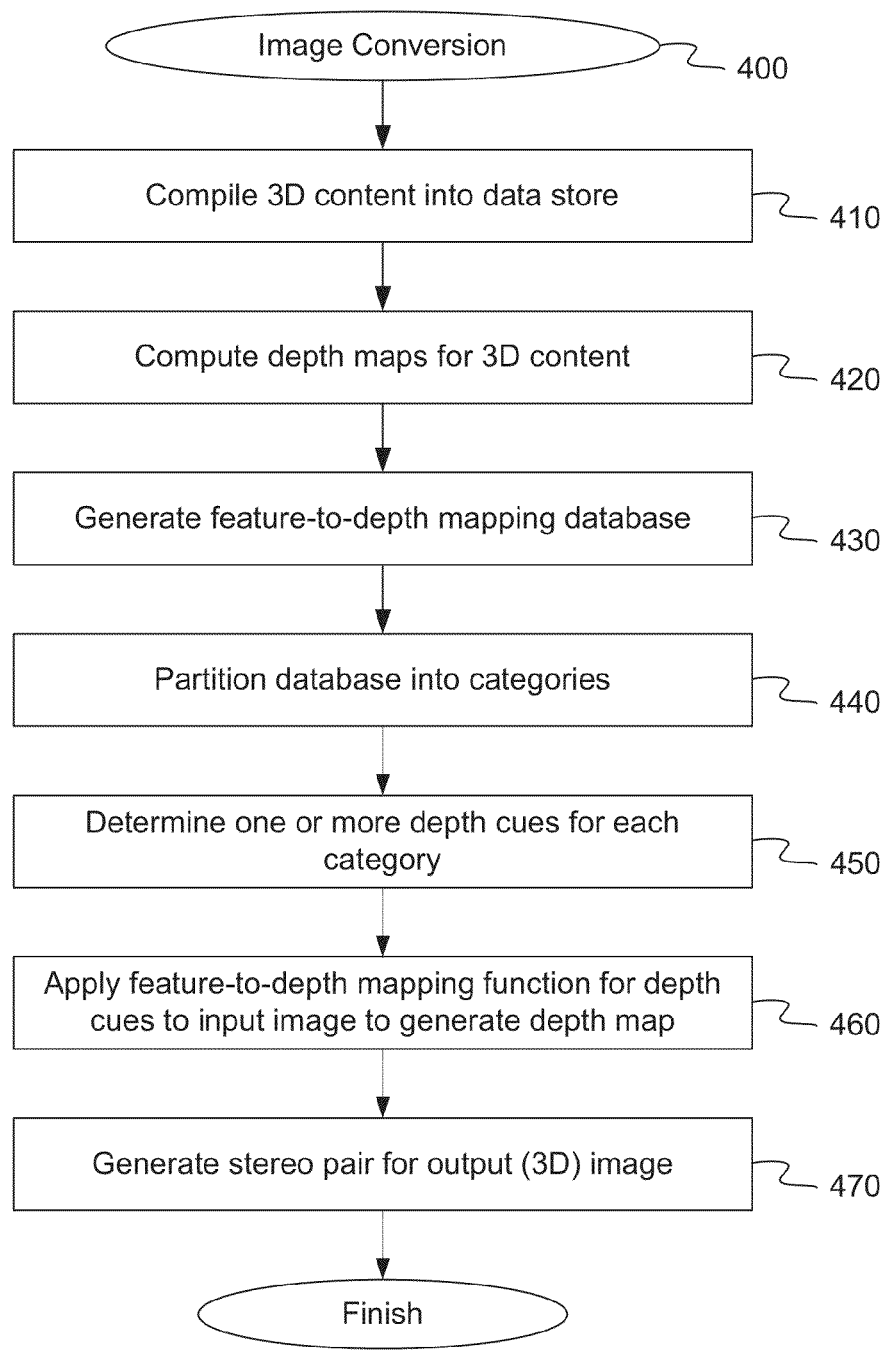
FIG. 4 is a flow diagram illustrating a method for image conversion, according to an implementation.

Referring to FIG. 4, method 400 can convert monoscopic visual content to stereoscopic 3D. At block 410, method 400 compiles 3D content into a data store, such as image data store 222. The 3D content may include, for example, 3D images including a stereo image pair, 3D videos including a series of frames, where each frame includes a stereo image pair, or a single image and a corresponding depth map. In one implementation, the 3D content may include user uploaded 3D online videos. In other implementations, the 3D content may include images or videos from some other source. At block 420, method 400 identifies a number of stereo image pairs in the 3D content and computes a depth map for each of the stereo image pairs from the 3D content in image data store 222. Pixel depth module 212 can compute the depth maps based on a disparity between pixels of the images in each stereo image pair. At block 430, method 400 generates a feature-to-depth mapping database 224 using the depth maps computed at block 420. Feature-to-depth mapping module 214 can store the depth map in association with the 3D content in feature-to-depth mapping database 224. For example, the depth map may have an index associated with it that points to an image in image data store 222, or a copy of one image of the stereo image pair (e.g., the left image) may be stored with the depth map in feature-to-depth mapping database 224.

At block 440, method 400 partitions feature-to-depth mapping database 224 into categories. Category module 215 can divide the stereo image pairs from the 3D content into a variety of categories or classifications based on visual features of the images. Examples of the categories may include indoor vs. outdoor scenes, daytime v. nighttime scenes, etc. In one implementation, the outdoor scenes are divided into sub-categories, such as urban scenes, greenery scenes, desert scenes, beach scenes, etc. At block 450, method 400 determines one or more depth cues for each category. Depth cue module 216 can determine the depth cues including, for example, a color-depth prior, a spatial-depth prior, or some other depth cue. In one implementation, multiple depth cues may be used for each category in order to refine the accuracy of the resulting feature-to-depth mapping function.

At block 460, method 400 generates the feature-to-depth mapping function for each category or sub-category in feature-to-depth mapping database 224. Feature-to-depth mapping module 214 may combine (e.g., average) the depth values for pixels that share a common feature value (e.g., color or spatial location) across all or multiple images in a category into a single feature-to-depth mapping function. In one implementation, the resulting function is stored in feature-to-depth mapping database 224. Depth map generation module 217 can generate a depth map for a 2D input image using the feature-to-depth mapping function. In one implementation, depth map generation module 217 can apply color values (or other appropriate feature values) as inputs to the feature-to-depth mapping function. This results in a depth value being calculated for each pixel of the input image. The depth values may be combined, based on the location of their associated pixels, to form a depth map. In one implementation, depth map generation module 217 optionally de-noises the map. In another implementation, depth map generation module 217 generates a depth map for individual tiles within the input image and then interpolates between the separate depth maps.

At block 470, method 400 generates a stereo pair for a 3D output image. In one implementation, rendering module 218 can render a 3D output image based on the input image and the depth values calculated by depth map generation module 217 at block 460. In one implementation, rendering module 218 may use depth image based rendering (DIBR) techniques to generate the 3D image. The output image may be stored or displayed for viewing by a user. In one implementation, the output image includes the input image, which is treated as the left view of a stereo pair, and a second image (e.g., based on the depth values), which is treated as the right view of the stereo pair. In other implementations, the position of these images may be reversed.

Figure 5:
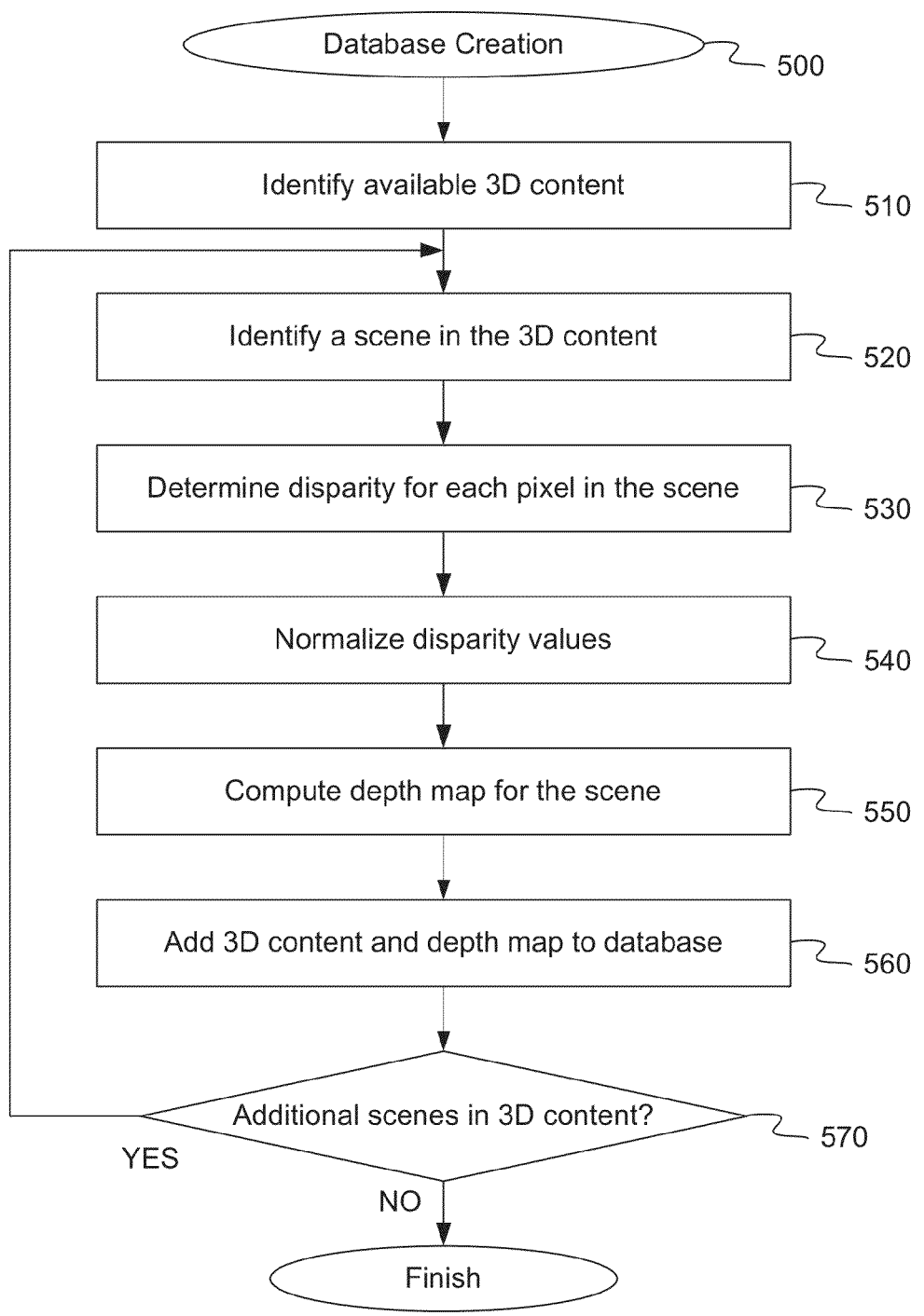
FIG. 5 is a flow diagram illustrating a method for creating feature-to-depth mapping for visual content, according to an implementation.

FIG. 5 is a flow diagram illustrating a method 500 for creating a feature-to-depth mapping for visual content according to an implementation of the present disclosure. Method 500 can create feature-to-depth mappings used to convert monoscopic visual content to stereoscopic 3D content.

Referring to FIG. 5, at block 510, method 500 identifies an available piece of 3D content from image data store 222. In one implementation, image data store 222 may include a corpus of 3D images and/or videos for which feature information (e.g., color or location) and depth values are known. In one implementation, the corpus includes millions of images and/or videos. At block 520, if the 3D content is a video, method 500 identifies a shot or scene in the 3D video. Shot detection module 211 can perform video processing on the 3D video to automatically detect transitions between shots or scenes in the video for the purpose of temporal segmentation of the video. Upon identifying a shot or scene, shot detection module 211 can store one or more representative frames (e.g., stereo images pairs) in image data store 222. The representative frames may be one example of the scene that shares visual qualities (e.g., colors, objects, textures, etc.) of most frames in the scene. In another implementation, shot detection module 211 store all frames in image data store 222.

At block 530, method 500 determines a disparity value for each pixel in the scene. In one implementation, disparity module 212 calculates the disparity using a stereo algorithm.

In one implementation, disparity module 212 calculates the disparity by performing an image rectification process and comparing a given point in each image of the stereo image pair, as described above. At block 540, method 400 normalizes the disparity values for the image so that they may be more easily compared to other images. In one implementation, the disparity values are normalized between values of −1 and +1. The largest disparity from the stereo image pair may be normalized to the value of +1, the smallest disparity normalized to the value of −1, and all intervening disparities normalized proportionally to a value between −1 and +1. In other implementations, the disparity values may be normalized to some other range of values.

At block 550, method 500 determines a depth value for pixels in the stereo image pair. In one implementation, pixel depth module 213 may use the disparity calculated by disparity module 212 as the depth value. In other implementations, the depth value may instead be a function of or otherwise based on the disparity (e.g., proportional to the disparity). Pixel depth module 213 may store these depth values, for example, as metadata associated with the images in image data store 222 or combine them into a depth map based on the pixel location.

At block 560, method 500 stores the 3D content and depth map in image data store 222. At block 570, method 500 determines if there are additional scenes in the 3D content. If there are additional scenes, method 500 may return to block 510 and repeat blocks 510-560 for each remaining scene in the 3D content.

Figure 6:
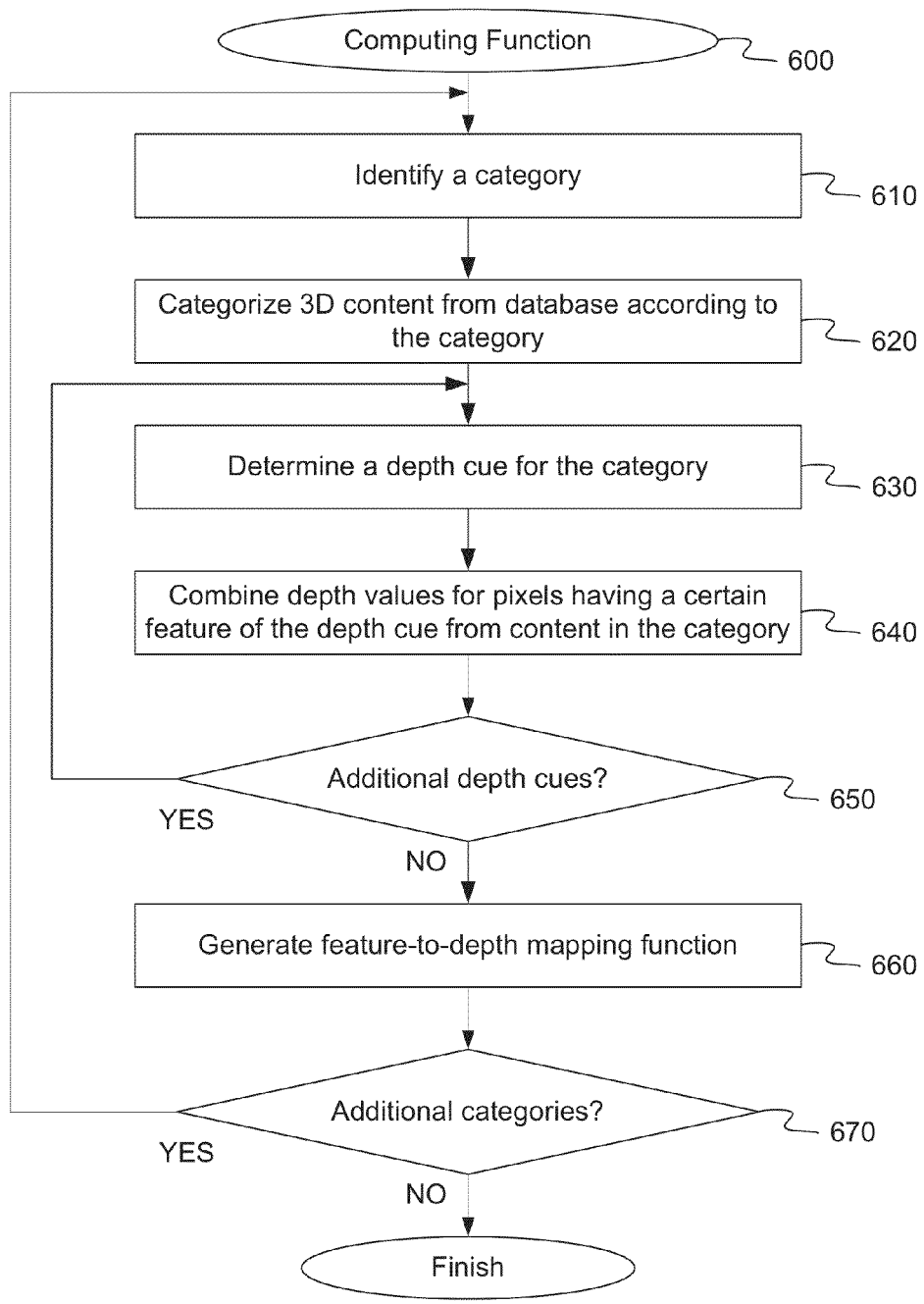
FIG. 6 is a flow diagram illustrating a method for computing a feature-to-depth mapping function, according to an implementation.

FIG. 6 is a flow diagram illustrating a method 600 for computing a feature-to-depth mapping function according to an implementation of the present disclosure. The method 600 can create a feature-to-depth mapping function used to convert monoscopic visual content to stereoscopic 3D content.

Referring to FIG. 6, at block 610, method 600 identifies a first category from the categories used by category module 215. Examples of the categories may include indoor vs. outdoor scenes, daytime v. nighttime scenes, etc. In one implementation, the outdoor scenes are divided into sub-categories, such as urban scenes, greenery scenes, desert scenes, beach scenes, etc. At block 620, method 600 categorizes the 3D content from image data store 222 according to the identified category. Category module 215 can identify images from image data store 222 that meet the criteria of the first category. For example, category module 215 can examine visual features of an image (e.g., predominant colors, shapes, brightness, etc.) and compare those features to listed features associated with the first category. Category module 215 may categorize any image that meets a certain amount of the criteria as being a member of the first category.

At block 630, method 600 determines a depth cues for the first category. Depth cue module 216 can determine the depth cue, which may include, for example, a color-depth prior, a spatial-depth prior, or some other depth cue. A prior may include a broad statistical average of values for a particular feature, without including local (i.e., image specific) information. At block 640, method 600 combines depth values for pixels having a certain feature of the depth cue from the 3D content that was associated with the first category at block 620. For example, for a color-depth prior, depth cue module 216 may combine (e.g., average) the depth values for each pixel across the images that has a certain color value. In different implementations, depth cue module 216 may examine all images in the first category or only a select number of representative images. For a spatial-depth prior, depth cue module 216 may combine the depth values for each pixel across the images that is spatially located at a certain location in the image. The location may be determined using a normalized coordinate system that may be used across all the images in image data store 222.

Figure 7:
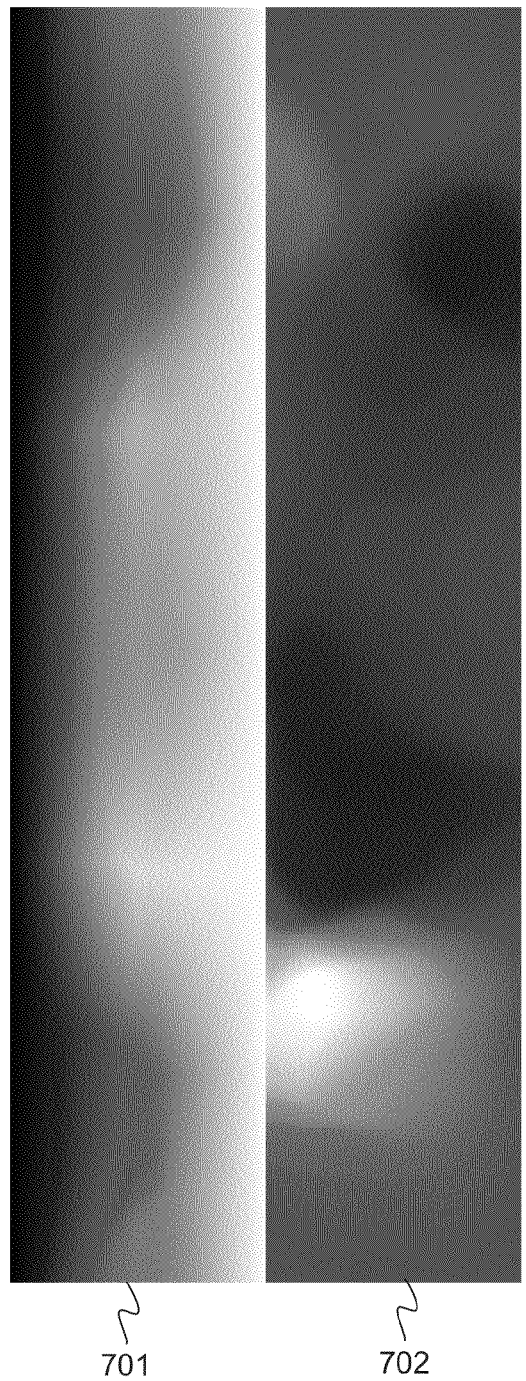
FIG. 7 is a diagram illustrating a depth map for a color depth prior, according to an implementation.

FIG. 7 is a diagram illustrating a depth map for a color depth prior, according to an implementation of the present disclosure. As described above, depth cue module 216 may combine the depth values for each pixel across the images of given category that has a certain color value. Color map 701 illustrates the range of color values that are found across the images. Depth map 702 illustrates the combined depth value (e.g., the mean or median) for each point in the color space, as shown in color map 701. In this implementation, lower depth values are represented as light shades in depth map 702 and higher depth values are represented as darker shades. Thus, depth map 702 indicates that reddish shades generally are found in the foreground of images (hence the lower depth values). This may be attributable to the fact that in outdoor scenes, objects closer to the viewpoint show more redness because of atmospheric absorption and scattering and in indoor scenes, human skin shows redness and is often found in the foreground. In addition, depth map 702 indicates that green and blue shades are generally found in the background, as they typically have higher depth values. Green and blue shades may typically be found in the sky in outdoor scenes and are thus much further from the viewpoint. In one implementation, the averaged depth values corresponding to each color may be stored in a look-up table (e.g., in storage device 120) and may be accessed by depth map generation module 217 when converting a 2D input image to 3D.

Figure 8A:
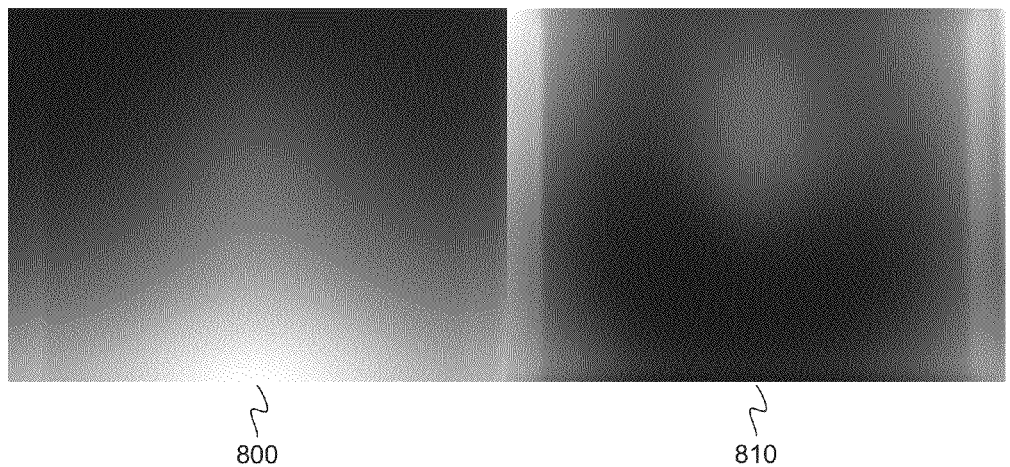
FIG. 8A is a diagram illustrating a depth map and variance map for a spatial depth prior, according to an implementation.
Figure 8B:
FIG. 8B is a diagram illustrating a depth map computed according to an implementation.

FIG. 8A is a diagram illustrating a depth map and variance map for a spatial depth prior, according to an implementation of the present disclosure. As described above, depth cue module 216 may combine the depth values for each pixel across the images of given category that has a certain spatial location. For example, depth cue module 216 may normalize the location of pixels in an image onto x,y coordinate system with values for x and y ranging between zero and one. Depth map 800 illustrates the combined depth values (e.g., the mean or median) for pixels in that normalized x,y coordinate system. In this implementation, lighter colors indicate a depth that is closer to the viewpoint, while darker colors indicate a depth that is further away. Depth map 800 indicates that there is a strong indication of pixels in the lower portion of the images being closer to the view point (hence the lower depth values). This may be attributable to the fact that in most images, the ground is closer to the viewpoint and the main subject of the image is typically located near the middle of the image, with background objects located above and behind the subject. Variance map 810 indicates how much the depth values of pixels at a certain location vary from the mean value shown in depth map 800. In this implementation, darker colors indicate a lower variance. Variance map 810 indicates that, in general, the variance is fairly low, meaning that the spatial depth prior indicated in depth map 800 is fairly accurate.

FIG. 8B is a diagram illustrating a depth map computed according to an implementation of the present disclosure. Depth map generation module 217 may compute a depth map for an image based on a feature-to-depth mapping function. In the depth map 830 of FIG. 8B, the shading is proportional to the distance of the surfaces of scene objects from the viewpoint in the source image 820. In this implementation, darker colors indicate a depth that is closer to the viewpoint, while lighter colors indicate a depth that is further away. In other implementations, the shading may be reversed.

In one implementation, in addition or in place of the color depth prior and the spatial depth prior, depth cue module 216 may use a K nearest neighbor algorithm (KNN). KNN is a method for classifying objects based on the closest available training examples. K may be a positive integer (e.g., 25). The neighbors may be taken from a set of objects (e.g., stored in image data store 222) for which correct feature values (e.g., color values) and depth values are known. The input image may be compared to the images in image data store 222 and the K images that share the most characteristics with the input image can be identified. The characteristics may include, for example, colors, shapes, textures, or other visual similarities. The parameter K may be a default value or assigned by a user or other program, and may have any value. In one implementation, a threshold may be defined, such as a number of characteristics that must be shared between the input image and an image from data store 222 if the image is to be used in determining a feature-to-depth mapping function. A feature-to-depth mapping function can be generated from the feature values across the K images identified by the KNN algorithm.

Referring again to FIG. 6, at block 650, method 600 determines if there are additional depth cues. In one implementation, multiple depth cues may be used for each category in order to refine the accuracy of the resulting feature-to-depth mapping function. The use of multiple depth cues is optional, and in one implementation, only one depth cue may be used at a time. If at block 650, method 600 determines that there are additional depth cues, method 600 returns to block 630 and repeats blocks 630 and 640 for each remaining depth cue. If there are no additional depth cues, method 600 proceeds to block 660.

At block 660, method 600 generates a feature-to-depth mapping function based on the depth values combined at block 640. In one implementation, feature-to-depth mapping module 214 may combine the averaged depth values for each feature (e.g., color or pixel location) into a feature-to-depth mapping function. Feature-to-depth mapping module 214 can perform some form of polynomial fit (e.g., curve fitting) to generate the feature-to-depth mapping function 400. The resulting function may be expressed as f(color)=depth, or f(x,y)=depth. Thus, the depth value for a given pixel is computed as a function of the color value and/or spatial location for that pixel. The resulting function can ultimately receive a color value, location value (or other feature value) for a certain pixel or other point as an input and output a depth value for that pixel. Feature-to-depth mapping module may store the feature-to-depth mapping function in database 224.

At block 670, method 600 determines if there are additional categories of 3D content. If there are additional categories, method 600 may return to block 610 and repeat blocks 610-660 for each remaining category.

Figure 9:
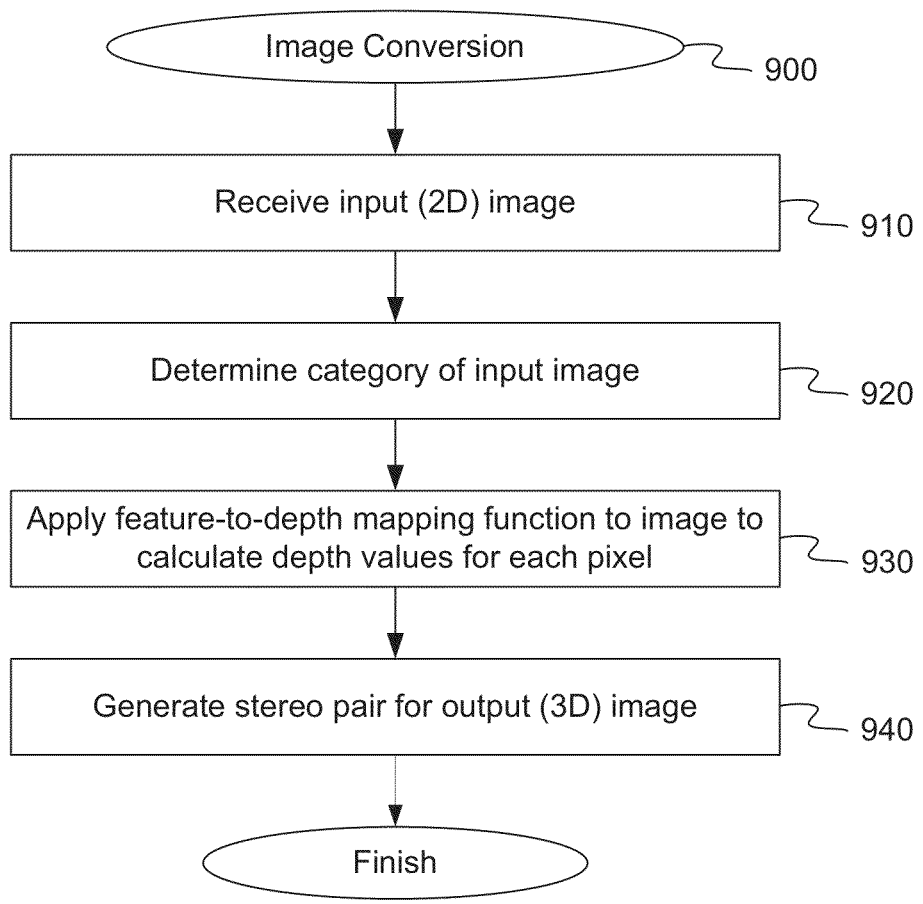
FIG. 9 is a flow diagram illustrating a method for image conversion, according to an implementation.

FIG. 9 is a flow diagram illustrating a method 900 for image conversion according to an implementation of the present disclosure. The method 900 can convert monoscopic visual content to stereoscopic 3D content.

Referring to FIG. 9, at block 910, method 900 receives a 2D input image to be converted to 3D. The 2D input image may be uploaded by a user, download over a network (e.g., the Internet) or received from some other source. At block 920, method 900 determines a category of the received input image. Category module 215 can examine visual features of the input image (e.g., predominant colors, shapes, brightness, etc.) and compare those features to listed features associated with the various categories. Category module 215 may categorize an image that meets a certain amount of the criteria as being a member of a certain category.

At block 930, method 900 applies the feature-to-depth mapping function of the determined category to the input image to calculate a depth value for each pixel in the image. In one implementation, depth map generation module 217 applies color values, location values, or other appropriate feature values of the pixels as inputs to the feature-to-depth mapping function. This may result in a depth value being calculated for each pixel of the input image. The depth values may be combined, based on the location of their associated pixels, to form a depth map. The depth map may be stored in storage device 120.

At block 940, method 900 generates a stereo pair for a three-dimensional output image. In one implementation, rendering module 218 may render a three-dimensional output image based on the input image and the depth values calculated by depth map generation module 217 at block 930. In one implementation, rendering module 218 may use depth image based rendering (DIBR) techniques to generate the 3D image. The output image may be stored or displayed for viewing by a user. In one implementation, the output image includes the input image, which is treated as the left view of a stereo pair, and a second image (e.g., based on the depth values), which is treated as the right view of the stereo pair. In other implementations, the position of these images may be reversed.

Figure 10:
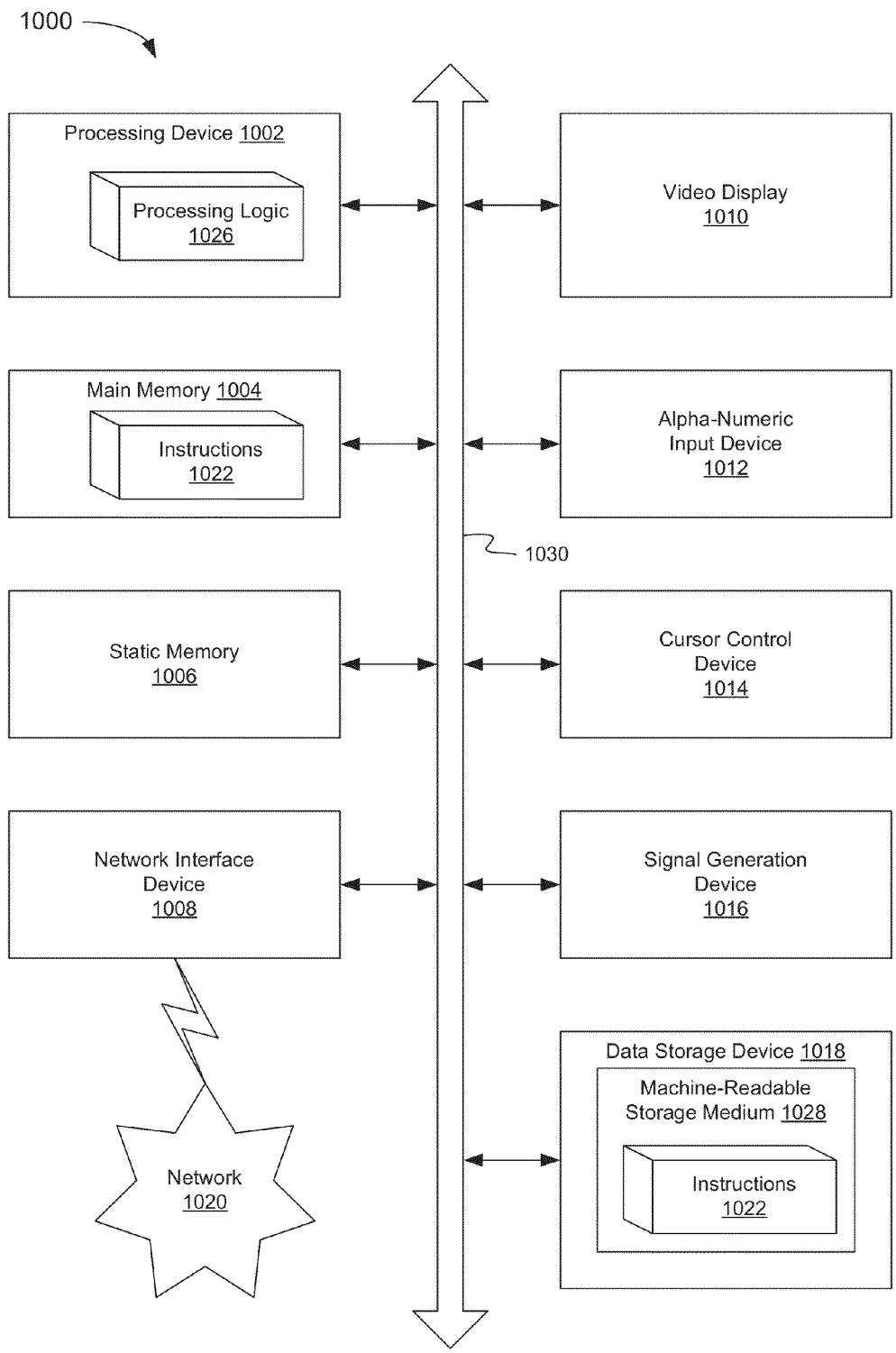
FIG. 10 is a block diagram illustrating one implementation of a computer system, in accordance with an aspect of this disclosure.

FIG. 10 illustrates a diagrammatic representation of a machine in the exemplary form of a computer system 1000 within which a set of instructions, for causing the machine to perform any one or more of the methodologies discussed herein, may be executed. In alternative implementations, the machine may be connected (e.g., networked) to other machines in a local area network (LAN), an intranet, an extranet, or the Internet. The machine may operate in the capacity of a server or a client machine in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein. In one implementation, computer system 1000 may be representative of a server, such as server 102, running image converter 110.

The exemplary computer system 1000 includes a processing device 1002, a main memory 1004 (e.g., read-only memory (ROM), flash memory, dynamic random access memory (DRAM) (such as synchronous DRAM (SDRAM) or Rambus DRAM (RDRAM), etc.), a static memory 1006 (e.g., flash memory, static random access memory (SRAM), etc.), and a data storage device 1018, which communicate with each other via a bus 1030. Any of the signals provided over various buses described herein may be time multiplexed with other signals and provided over one or more common buses. Additionally, the interconnection between circuit components or blocks may be shown as buses or as single signal lines. Each of the buses may alternatively be one or more single signal lines and each of the single signal lines may alternatively be buses.

Processing device 1002 represents one or more general-purpose processing devices such as a microprocessor, central processing unit, or the like. More particularly, the processing device may be complex instruction set computing (CISC) microprocessor, reduced instruction set computer (RISC) microprocessor, very long instruction word (VLIW) microprocessor, or processor implementing other instruction sets, or processors implementing a combination of instruction sets.

Processing device 1002 may also be one or more special-purpose processing devices such as an application specific integrated circuit (ASIC), a field programmable gate array (FPGA), a digital signal processor (DSP), network processor, or the like. The processing device 1002 is configured to execute processing logic 1026 for performing the operations and steps discussed herein.

The computer system 1000 may further include a network interface device 1008. The computer system 1000 also may include a video display unit 1010 (e.g., a liquid crystal display (LCD) or a cathode ray tube (CRT)), an alphanumeric input device 1012 (e.g., a keyboard), a cursor control device 1014 (e.g., a mouse), and a signal generation device 1016 (e.g., a speaker).

The data storage device 1018 may include a machine-readable storage medium 1028, on which is stored one or more set of instructions 1022 (e.g., software) embodying any one or more of the methodologies of functions described herein. The instructions 1022 may also reside, completely or at least partially, within the main memory 1004 and/or within the processing device 1002 during execution thereof by the computer system 1000; the main memory 1004 and the processing device 1002 also constituting machine-readable storage media. The instructions 1022 may further be transmitted or received over a network 1020 via the network interface device 1008.

The machine-readable storage medium 1028 may also be used to store instructions to perform a method for conversion of monoscopic video to stereoscopic 3D using an image-depth database, as described herein. While the machine-readable storage medium 1028 is shown in an exemplary implementation to be a single medium, the term "machine-readable storage medium" should be taken to include a single medium or multiple media (e.g., a centralized or distributed database, and/or associated caches and servers) that store the one or more sets of instructions. A machine-readable medium includes any mechanism for storing information in a form (e.g., software, processing application) readable by a machine (e.g., a computer). The machine-readable medium may include, but is not limited to, magnetic storage medium (e.g., floppy diskette); optical storage medium (e.g., CD-ROM); magneto-optical storage medium; read-only memory (ROM); random-access memory (RAM); erasable programmable memory (e.g., EPROM and EEPROM); flash memory; or another type of medium suitable for storing electronic instructions.

The preceding description sets forth numerous specific details such as examples of specific systems, components, methods, and so forth, in order to provide a good understanding of several implementations of the present invention. It will be apparent to one skilled in the art, however, that at least some implementations of the present invention may be practiced without these specific details. In other instances, well-known components or methods are not described in detail or are presented in simple block diagram format in order to avoid unnecessarily obscuring the present invention. Thus, the specific details set forth are merely exemplary. Particular implementations may vary from these exemplary details and still be contemplated to be within the scope of the present invention.

Reference throughout this specification to "one implementation" or "an implementation" means that a particular feature, structure, or characteristic described in connection with the implementation is included in at least one implementation. Thus, the appearances of the phrase "in one implementation" or "in an implementation" in various places throughout this specification are not necessarily all referring to the same implementation. In addition, the term "or" is intended to mean an inclusive "or" rather than an exclusive "or."

That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form.

Although the operations of the methods herein are shown and described in a particular order, the order of the operations of each method may be altered so that certain operations may be performed in an inverse order or so that certain operation may be performed, at least in part, concurrently with other operations. In another implementation, instructions or sub-operations of distinct operations may be in an intermittent and/or alternating manner. Furthermore, not all illustrated acts may be required to implement aspects of the disclosed subject matter. In addition, those skilled in the art will understand and appreciate that the methods could alternatively be represented as a series of interrelated states via a state diagram or events. Additionally, it should be appreciated that the methods disclosed in this specification are capable of being stored on an article of manufacture to facilitate transporting and transferring such methods to computing devices. The term "article of manufacture," as used herein, is intended to encompass a computer program accessible from any computer-readable device or storage media.

What is claimed is:

1. A method comprising:
   receiving a two-dimensional image to be converted to a three-dimensional image;
   determining a category of the image;
   applying feature values for a plurality of pixels in the two-dimensional image to a feature-to-depth mapping function associated with the category to determine a depth value for each of the plurality of pixels; and
   generating, by a processing device, the three-dimensional image based on the depth values for the plurality of pixels of the two-dimensional image.

2. The method of claim 1, wherein the feature-to-depth mapping function combines depth values for a plurality of pixels in a plurality of images across the category having a first feature value.

3. The method of claim 2, wherein the first feature value comprises at least one of a color value or a spatial location value.

4. The method of claim 2, wherein the plurality of images across the category are stored in a feature-to-depth mapping database.

5. The method of claim 1, where the feature-to-depth mapping function is based on a depth cue for the category.

6. The method of claim 5, further comprising:
   compiling three-dimensional content into a data store;
   identifying a plurality of stereo image pairs from the three-dimensional content;
   computing a depth map for each of the stereo image pairs from the three-dimensional content;
   partitioning the plurality of stereo image pairs in the data store into a plurality of categories; and
   determining, by a processing device, the depth cue for each of the plurality of categories based on the depth map for each of the plurality of stereo image pairs in each category.

7. The method of claim 1, wherein the category comprises at least one of an outdoor scene, an indoor scene, a daytime scene, or a nighttime scene.

8. A non-transitory machine-readable storage medium storing instructions which, when executed, cause processing device to perform operations comprising:
   receiving a two-dimensional image to be converted to a three-dimensional image;
   determining a category of the image;
   applying feature values for a plurality of pixels in the two-dimensional image to a feature-to-depth mapping function associated with the category to determine a depth value for each of the plurality of pixels; and
   generating, by the processing device, the three-dimensional image based on the depth values for the plurality of pixels of the two-dimensional image.

9. The non-transitory machine-readable storage medium of claim 8, wherein the feature-to-depth mapping function combines depth values for a plurality of pixels in a plurality of images across the category having a first feature value.

10. The non-transitory machine-readable storage medium of claim 9, wherein the first feature value comprises at least one of a color value or a spatial location value.

11. The non-transitory machine-readable storage medium of claim 9, wherein the plurality of images across the category are stored in a feature-to-depth mapping database.

12. The non-transitory machine-readable storage medium of claim 8, where the feature-to-depth mapping function is based on a depth cues for the category.

13. The non-transitory machine-readable storage medium of claim 12, the operations further comprising:
   compiling three-dimensional content into a data store;
   identifying a plurality of stereo image pairs from the three-dimensional content;
   computing a depth map for each of the stereo image pairs from the three-dimensional content;
   partitioning the plurality of stereo image pairs in the data store into a plurality of categories; and
   determining the depth cue for each of the plurality of categories based on the depth map for each of the plurality of stereo image pairs in each category.

14. The non-transitory machine-readable storage medium of claim 8, wherein the category comprises at least one of an outdoor scene, an indoor scene, a daytime scene, or a nighttime scene.

15. A system comprising:
   a processing device; and
   a memory coupled to the processing device; and
   an image converter, executable by the processing device from the memory, to:
      receive a two-dimensional image to be converted to a three-dimensional image;
      determine a category of the image;
      apply feature values for a plurality of pixels in the two-dimensional image to a feature-to-depth mapping function associated with the category to determine a depth value for each of the plurality of pixels; and
      generate the three-dimensional image based on the depth values for the plurality of pixels of the two-dimensional image.

16. The system of claim 15, wherein the feature-to-depth mapping function combines depth values for a plurality of pixels in a plurality of images across the category having a first feature value.

17. The system of claim 16, wherein the first feature value comprises at least one of a color value or a spatial location value.

18. The system of claim 16, wherein the plurality of images across the category are stored in a feature-to-depth mapping database.

19. The system of claim 15, where the feature-to-depth mapping function is based on a depth cues for the category.

20. The system of claim 15, wherein the category comprises at least one of an outdoor scene, an indoor scene, a daytime scene, or a nighttime scene.

\* \* \* \* \*